M. JOYCE, Jr.
DEVICE TO TRIM HORSES' HOOFS.
APPLICATION FILED JAN. 27, 1913.
1,067,658.
Patented July 15, 1913.
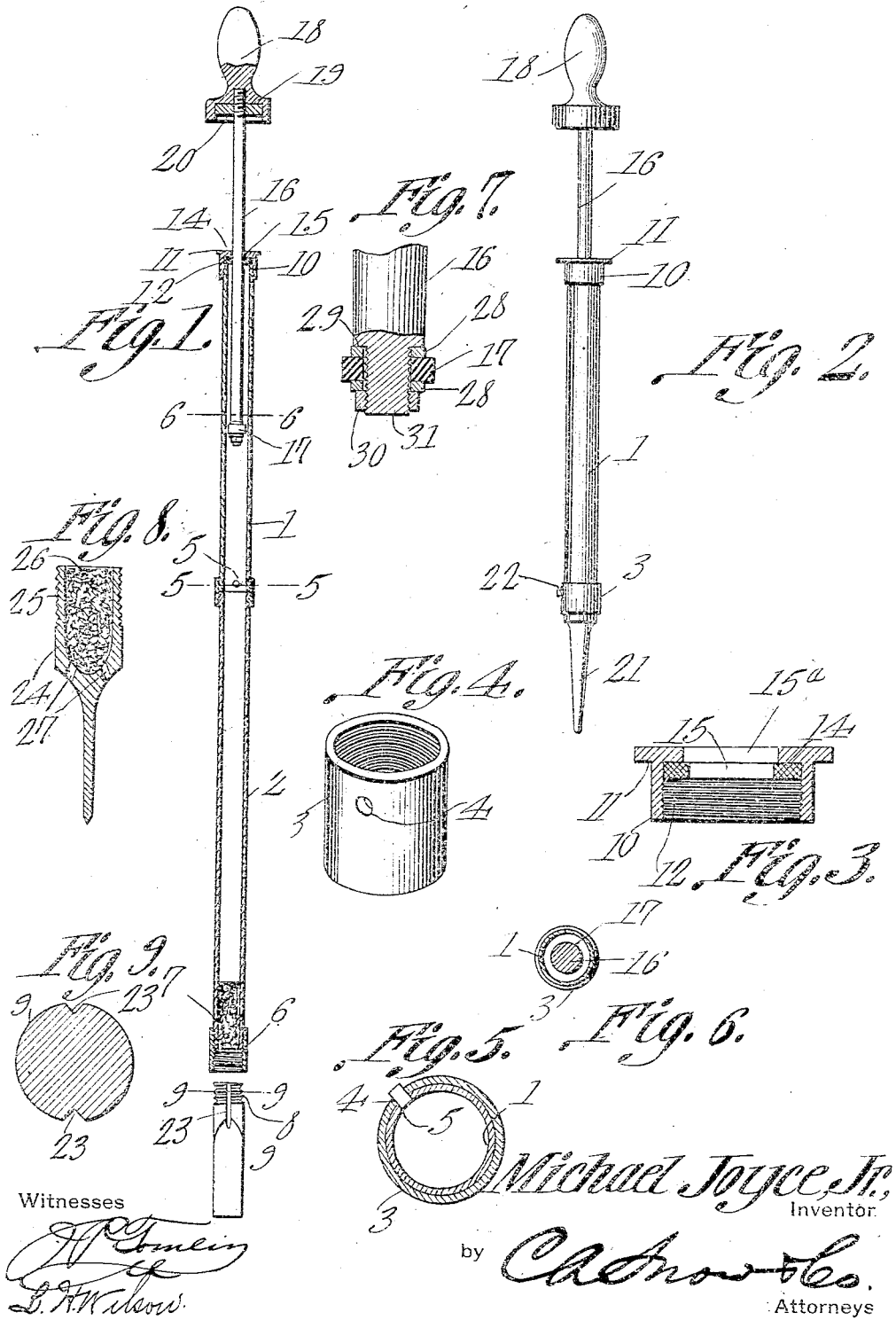

UNITED STATES PATENT OFFICE.

MICHAEL JOYCE, JR., OF BURDETTE, SOUTH DAKOTA.

DEVICE TO TRIM HORSES' HOOFS.

1,067,658.

Specification of Letters Patent.  Patented July 15, 1913.

Application filed January 27, 1912. Serial No. 744,523.

*To all whom it may concern:*

Be it known that I, MICHAEL JOYCE, Jr., a citizen of the United States, residing at Burdette, in the county of Hand and State of South Dakota, have invented a new and useful Device to Trim Horses' Hoofs, of which the following is a specification.

The device forming the subject matter of this application is adapted primarily, although not exclusively to be employed in the trimming of horses' hoofs, and one object of the invention is to provide a hoof trimmer which will operate noiselessly.

A further object of the invention is to provide a hoof trimmer having means for lubricating the hoof trimming tool.

Another object of the invention is to provide a device of the type above mentioned, which may be transformed into a farrier's syringe.

It is within the scope of the invention to improve generally, and to increase the utility of, devices of that type to which the present invention appertains.

With the foregoing and other objects in view which will appear as the description proceeds, the invention resides in the combination and arrangement of parts and in the details of construction hereinafter described and claimed, it being understood that changes in the precise embodiment of invention can be made within the scope of what is claimed without departing from the spirit of the invention.

In the drawing:—Figure 1 shows the invention in longitudinal section; Fig. 2 is a side elevation of the device reassembled in the form of a farrier's syringe; Fig. 3 is a transverse section of the cap, which, being carried by the casing, receives the blow of the driving plunger; Fig. 4 is a perspective of the member which constitutes a connection between the parts of the casing; Fig. 5 is a section on the line 5—5 of Fig. 1; Fig. 6 is a section on the line 6—6 of Fig. 1; Fig. 7 is a sectional elevation showing the inner or lower end of the plunger; Fig. 8 is a longitudinal section showing one form of tool; and Fig. 9 is a transverse section of another form of tool, on the line 9—9 of Fig. 1.

In carrying out the invention, there is provided a casing, preferably comprising a primary part 1 and a secondary part 2, the adjacent ends of the parts 1 and 2 being threaded into a collar 3, the same being provided with port 4 alined with a port 5 in the part 1 and adapted to receive a closure plug 22. Threaded upon the lower end of the secondary part 2, or otherwise secured thereto, is a coupling 6, adapted to receive the threaded tang 8 of a cutting tool 9. Located above the cutting tool 9 and housed within the secondary part 2 of the casing is an oil retarding element 7 which may be a sponge, a mass of cotton waste or the like. Openings are provided in the tool 9 which permit the oil to flow from the oil retarding element 7 downwardly upon the side faces of the cutting tool. These openings in the present instance, take the form of grooves 23, located longitudinally in the side face of the tool. If desired, the tool shown in Fig. 1 and designated by the reference character 9 may be replaced by another tool, indicated by the reference character 24 and shown in longitudinal section in Fig. 8. The tool 24 is provided with a threaded shank 25, as before, and is equipped with a central chamber receiving an oil retarding element 26 of the sort hereinbefore described. In the lower end of the tool 24 and communicating with the chamber in which the oil retarding element 26 is located, are openings 27, permitting the oil to flow downwardly upon the side faces of the tool.

The invention further includes a cap 10 which is mounted upon the upper end of the primary part 1 of the casing, the cap 10 preferably being internally threaded as indicated at 12, for the engagement with the primary part 1. At the upper end of the cap 10 is formed a transverse flange 11 and between the flange 11 and the upper end of the primary part 1 of the casing is bound a resilient gasket 14, constituting a closure, the gasket 14 being equipped with a central opening 15, which, preferably, is somewhat smaller in diameter than the opening 15ª in the flange 11, for a purpose which will be set forth hereinafter.

The invention further includes a plunger, the plunger comprising a piston rod 16, mounted to slide in the opening 15 in the gasket 14. Owing to the construction last above outlined, the piston rod 16 is spaced apart from the flange 11 so that there will be no scraping sound as the piston rod is reciprocated. The piston rod 16 carries a resilient piston head 17, held between washers 18, the upper of which abuts against a shoulder 19 upon the piston rod, the lower of which is engaged by a nut 30 mounted upon the threaded extremity 31 of the piston rod. Secured to the outer end of the piston rod 16 is a relatively heavy head 18, provided in its under face with a recess 19 receiving a resilient buffer 20.

In practical operation, the closure plug 22 is removed, and the desired quantity of lubricant is inserted through the ports 4 and 5, into the interior of the secondary part 2 of the casing, the oil being prevented from flowing out of the ducts or openings 23 in the tool 9, by means of the oil retarding element 7.

When the plunger is forced downwardly, the relatively heavy head 18 will be received by the cap 10, an impulse being thereby imparted to the casing which will serve to drive the tool 9 into and through the hoof of the horse. Obviously, the buffer 20, engaging the cap 10, will permit the structure to operate noiselessly, a frightening of the horse being thereby avoided.

In order that the head 18 may exercise its full efficiency as a driving element, it is desirable that the head 17 should cause a minimum compression within the casing. To this end, the nut 30 is manipulated so as to expand the piston head sufficiently to create a very slight compression within the casing, only sufficient compression being generated to force the oil out of the ducts or grooves 23.

In practice, it is necessary that the piston head 17 have a slight and almost imperceptible bearing upon the interior of the member 1 of the casing. Under the circumstance above pointed out, when the plunger is depressed, a small quantity of oil will flow out of the grooves 23 upon each stroke of the plunger, the cutting tool 9 being thereby lubricated.

In that form of the invention which appears in Fig. 8, the operation above outlined takes place, the oil flowing outwardly through the openings 27.

As a useful feature, which however, cannot be claimed, it is to be noted that it is possible to remove the secondary part 2 from the collar 3 and to replace the secondary part by a nozzle 21, as shown in Fig. 2, under which circumstances, the device may be used as a farrier's syringe. When the structure is used as a farrier's syringe, the nut 30 is rotated, expanding the piston head 17, until the same has the desired bearing upon the inner face of the primary part 1 of the casing.

Having thus described the invention, what is claimed is:—

1. A device of the class described comprising as constituent parts, a casing and a tool carried by the casing, one of which constituent parts is provided with a lubricant outlet discharging upon the outer face of the tool; and a unitary means for imparting a blow to the casing and for creating a fluid pressure within the casing above the outlet.

2. A device of the class described, comprising as constituent parts, a casing and a tool carried by the casing, one of which constituent parts is provided with a lubricant outlet discharging upon the outer face of the tool; a unitary means for imparting a blow to the casing and for creating a fluid pressure within the casing above the outlet; the casing comprising alined tubular parts; a collar connecting the adjacent ends of the parts, the collar and one part being provided with alinable ports; and a plug in the ports, the plug constituting a closure for the ports and constituting means for preventing relative movement between one part and the collar.

3. A device of the class described comprising a casing; a plunger slidable in the casing; tool holding means carried by the casing; a gasket in the casing, in which gasket the plunger slides; and a cushioning buffer upon the plunger, adapted to engage the casing to impel the tool into the work; the gasket being of soft material to render the sliding of the plunger noiseless and the buffer serving to reduce the noise of the impact produced by the plunger upon the casing.

4. A device of the class described comprising a casing; a plunger slidable in the casing, the plunger including a piston head operating within the casing and a head adapted to engage one end of the casing; a tool assembled with the other end of the casing and provided with an opening communicating with the casing and an oil retarding element located above the opening.

5. In a device of the class described, a casing; a plunger slidable in the casing, the plunger including a head adapted to engage one end of the casing and a piston head operating within the casing; means for expanding the piston head within the casing; a tool mounted in the casing and provided with an opening communicating with the casing and an oil retarding element located above the opening.

6. In a device of the class described, a casing comprising alined tubular parts; a collar connecting the adjacent ends of the parts; the collar and one part being provided with alinable ports; a plug in the ports constituting a closure for the ports and constituting means for preventing relative movement between one part and the collar; a tool located at the end of one part and provided with an opening; an oil retarding member located above the opening; and means for imparting a blow to the casing and for creating a fluid pressure upon the oil retarding element.

7. In a device of the class described, a casing; a tool carried by the casing and provided with an opening; an oil retarding element located above the opening; and a combined means for imparting a blow to the casing and for creating a fluid pressure upon the oil retarding element.

In testimony that I claim the foregoing as my own, I have hereto affixed my signature in the presence of two witnesses.

MICHAEL JOYCE, Jr.

Witnesses:
G. E. RICHARDSON,
J. M. WILLIAMS.